US012527391B2

(12) United States Patent
Potabattuni et al.

(10) Patent No.: US 12,527,391 B2
(45) Date of Patent: Jan. 20, 2026

(54) LIQUID STORAGE DEVICE AND METHOD OF MANUFACTURING THEREOF

(71) Applicant: HCL Technologies Limited, New Delhi (IN)

(72) Inventors: Jeevan Potabattuni, Bangalore (IN); Anubhav Sircar, Bangalore (IN); Shrutika Dandekar, Bangalore (IN); Amey Mukund Shukla, Bangalore (IN)

(73) Assignee: HCL Technologies Limited, New Delhi (IN)

( * ) Notice: Subject to any disclaimer, the term of this patent is extended or adjusted under 35 U.S.C. 154(b) by 74 days.

(21) Appl. No.: 18/440,995

(22) Filed: Feb. 14, 2024

(65) Prior Publication Data

US 2025/0113913 A1  Apr. 10, 2025

(30) Foreign Application Priority Data

Oct. 9, 2023  (IN)  ............................. 202311067624

(51) Int. Cl.
*C02F 1/00* (2023.01)
*A45F 3/18* (2006.01)
*A61L 2/10* (2006.01)

(52) U.S. Cl.
CPC ...... *A45F 3/18* (2013.01); *A61L 2/10* (2013.01); *C02F 1/002* (2013.01); *A61L 2209/12* (2013.01); *C02F 2307/02* (2013.01)

(58) Field of Classification Search
CPC .............. A45F 3/18; A61L 2/10; C02F 1/002
See application file for complete search history.

(56) References Cited

U.S. PATENT DOCUMENTS 3,920,140 A * 11/1975 Kiser ................... B65D 23/003
                                                         215/399
5,106,500 A *  4/1992 Hembree ............... B01D 35/26
                                                         210/764

(Continued)

FOREIGN PATENT DOCUMENTS

WO   WO-2018104737 A1 *  6/2018 ................ C02F 9/20

OTHER PUBLICATIONS

LARQ Bottle—Self-Cleaning and Insulated Stainless Steel Water Bottle With Award-Winning Design and UV Water Sanitizer, 17Oz, Granite White (Pack of 1), 500 milliliter.

(Continued)

*Primary Examiner* — Jason W San
(74) *Attorney, Agent, or Firm* — Kendal M. Sheets

(57) ABSTRACT

The invention relates to a liquid storage device. The liquid storage device includes bottom section including container for storing liquid. The liquid storage device further includes middle section coupled to bottom section. The middle section includes stabilizing element for balancing liquid storage device and set of detachable handles for holding liquid storage device. It should be noted that a handle of set of the detachable handles is attached to stabilizing element for preventing liquid storage device from tremoring. The liquid storage device includes top section coupled to bottom section through middle section for receiving liquid from bottom section through pumping mechanism. The top section includes set of detachable attachments. One attachment of set of detachable attachments includes detachable cup for collecting liquid received from bottom section. The detachable cup includes an Ultraviolet-C button, which upon activation initiates sanitization of detachable cup and pumping mechanism to draw liquid into detachable cup.

7 Claims, 5 Drawing Sheets

(56) References Cited

U.S. PATENT DOCUMENTS

| | | | |
|---|---|---|---|
| 6,402,949 B1* | 6/2002 | Banks | C02F 1/002 210/411 |
| 10,561,156 B2* | 2/2020 | Liao | G01N 21/53 |
| 11,046,606 B2* | 6/2021 | Lovegrove | A45F 3/18 |
| 11,564,519 B1 | 1/2023 | Mills | |
| 2004/0074252 A1* | 4/2004 | Shelton | C02F 9/20 222/190 |
| 2005/0205480 A1* | 9/2005 | Kuhlmann | C02F 1/002 210/748.11 |
| 2008/0131330 A1* | 6/2008 | Lyon | A61L 2/24 422/186.3 |
| 2009/0173673 A1* | 7/2009 | Pritchard | B01D 63/025 210/120 |
| 2010/0012193 A1* | 1/2010 | Anson | B65D 47/243 206/219 |
| 2010/0102002 A1* | 4/2010 | O'Brien | C02F 1/002 210/228 |
| 2010/0215552 A1* | 8/2010 | Wu | C02F 1/003 422/186.3 |
| 2011/0084006 A1* | 4/2011 | Wu | C02F 1/003 210/85 |
| 2011/0233119 A1* | 9/2011 | Nelson | B05B 11/1001 210/117 |
| 2013/0319915 A1* | 12/2013 | Gellibolian | C02F 1/002 210/87 |
| 2014/0102965 A1* | 4/2014 | Jones | C02F 1/32 250/455.11 |
| 2014/0158640 A1* | 6/2014 | Elliott | C02F 1/50 210/764 |
| 2014/0158641 A1* | 6/2014 | Mukherjee | C02F 1/444 210/764 |
| 2014/0312082 A1* | 10/2014 | Scribner | A45C 13/30 224/148.6 |
| 2017/0280737 A1* | 10/2017 | Liao | C02F 1/725 |
| 2022/0388873 A1* | 12/2022 | Guduru | B65D 47/065 |

OTHER PUBLICATIONS

Snoozi set—Baby night bottle with warming station; Snoozi.

* cited by examiner

LIQUID STORAGE DEVICE AND METHOD OF MANUFACTURING THEREOF

TECHNICAL FIELD

This invention generally relates to containers. More specifically, the invention relates to a liquid storage device with a self-stabilizing element.

BACKGROUND

Liquid storage devices have played a crucial role in human civilization for ages, evolving in response to growing need for efficient, safe, and accessible ways to store and manage liquids. From ancient times to modern industrial societies, development of various liquid storage technologies has been driven by factors such as resource availability, technological innovation, economic considerations, and environmental concerns. One example of the liquid storage devices includes water storage devices. In regions where a reliable source of drinking water is not readily available, individuals often resort to carrying portable containers or bottles filled with potable water. These containers serve as a means to ensure access to safe and clean drinking water. This practice is especially crucial in situations where the natural water sources might be contaminated or impure, posing a significant health risk to those who consume untreated water.

The use of pre-filled water bottles or receptacles is a practical solution to address a vital need for clean water consumption. However, drinking water from surrounding environment without a proper treatment may lead to severe consequences, as the water might harbor various contaminants that may prove harmful or even life-threatening to humans. The water sources in such environments often contain a range of potential hazards, including bacteria, cysts, viruses, and other microorganisms that naturally inhabit the water. Consuming water directly from the contaminated sources may expose individuals to various waterborne diseases. Bacteria like *E. coli, Salmonella,* and *Vibrio cholerae,* along with protozoa such as Giardia and Cryptosporidium, may thrive in untreated water and cause gastrointestinal illnesses. Additionally, viruses like hepatitis A and norovirus may also spread through water consumption. These pathogens may lead to symptoms ranging from mild discomfort to severe dehydration, vomiting, diarrhea, and in extreme cases, even death.

On the other hand, for individuals with disabilities and elderly individuals who might be dealing with various health conditions (that diminish their strength and independence), options available in market are often limited, leaving them with few choices that adequately meet their unique needs. Such individuals not only overlook struggles associated with lifting, pouring, or heating water, but also performing such tasks may prove challenging and even risky.

The present invention is directed to overcome one or more limitations stated above or any other limitations associated with the known arts.

SUMMARY

In one embodiment, a liquid storage device is disclosed. In one example, the liquid storage device may include a bottom section including a container for storing liquid. The liquid storage device may further include a middle section coupled to the bottom section. The middle section may include a stabilizing element for balancing the liquid storage device. Further, the middle section may include a set of detachable handles for holding the liquid storage device. It should be noted that a handle of the set of the detachable handles may be attached to the stabilizing element for preventing the liquid storage device from tremoring. The liquid storage device may further include a top section coupled to the bottom section through the middle section for receiving the liquid from the bottom section through a pumping mechanism. The top section may include a set of detachable attachments. Further, one attachment of the set of detachable attachments may include a detachable cup for collecting the liquid received from the bottom section. The detachable cup may include an Ultraviolet-C (UV-C) button. The UV-C button, upon activation, may initiate sanitization of the detachable cup and the pumping mechanism to draw liquid into the detachable cup.

In another embodiment, a method of manufacturing a liquid storage device is disclosed. In one example, the method may include receiving a bottom section. The bottom section includes a container for storing liquid. The method may further include coupling the bottom section to the middle section. The middle section may include a stabilizing element integrated for balancing the liquid storage device. Further, the middle section includes a set of detachable handles for holding the liquid storage device. It should be noted that a handle of the set of detachable handles is attached to the stabilizing element for preventing the liquid storage device from tremoring. The method may further include coupling the bottom section to the top section through the middle section for receiving the liquid from the bottom section through a pumping mechanism. The top section may include a set of detachable attachments. Further, one attachment of the set of detachable attachments may include a detachable cup for collecting the liquid received from the bottom section. The detachable cup may include an Ultraviolet-C (UV-C) button, which upon activation, may be configured for initiating sanitization of the detachable cup and the pumping mechanism to draw the liquid into the detachable cup.

In yet another embodiment, a method of pumping liquid in a liquid storage device is disclosed. The method may include receiving a user input corresponding to pressing of an Ultraviolet-C (UV-C) button within a detachable cup of a top section of the liquid storage device. The method may further include initiating sanitization of the detachable cup. The method may further include initiating a pumping mechanism to collect the liquid in the detachable cup from a container of a bottom section.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
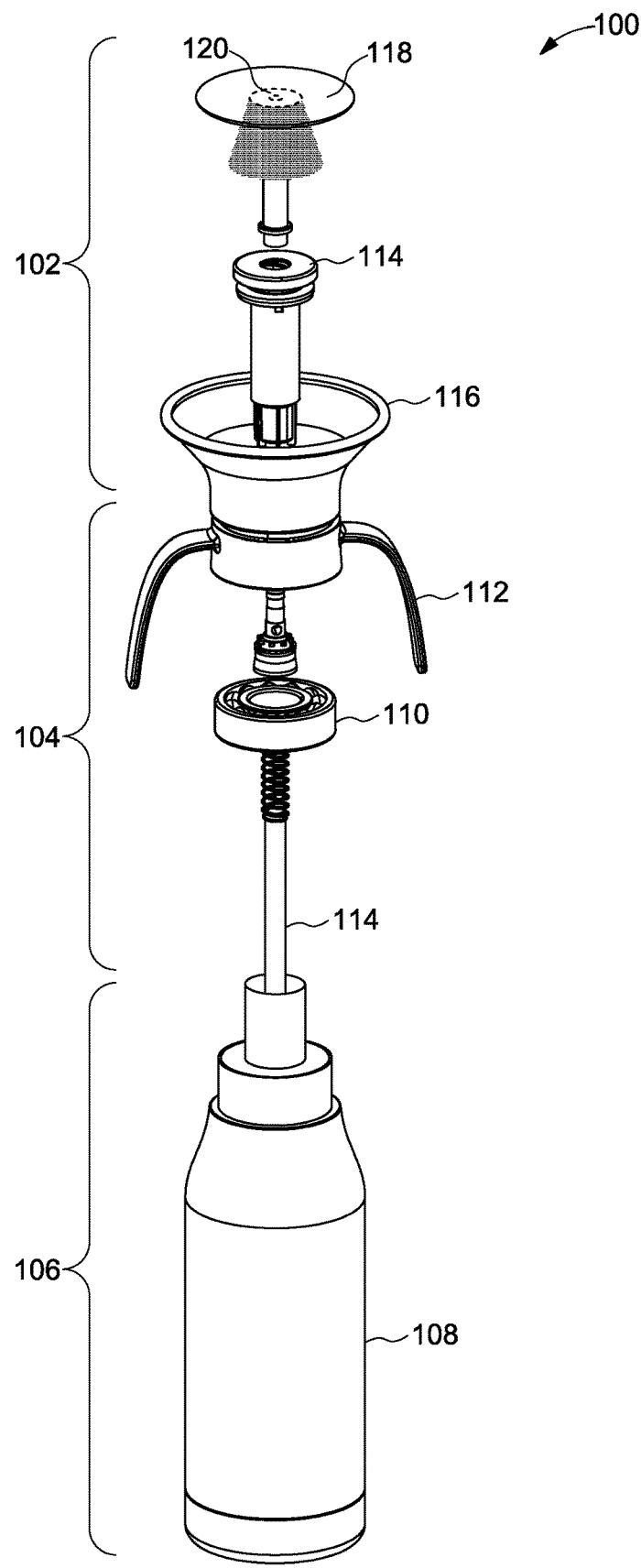
FIG. 1 illustrates an exploded view of an exemplary liquid storage device, in accordance with some embodiments of the present disclosure.

Referring now to FIG. 1, an exploded view of an exemplary liquid storage device 100 is illustrated, in accordance with some embodiments of the present disclosure. Examples of the liquid storage device 100 may include, but are not limited to, a bottle, a container, a liquid filter, a thermos, a liquid dispenser, or a storage flask. In FIG. 1, the bottle as the liquid storage device 100 is illustrated. Here, for brevity, the liquid storage device 100 is explained with respect to one example (i.e., the bottle), however the disclosure is also applicable to other examples. The liquid-storage device 100 may store liquid such as water, milk, juice, soda tea, or any other beverages. The liquid storage device/bottle 100 may include three sections, i.e., a top section 102, a middle section 104, and a bottom section 106.

The bottom section 106 may include a container 108. The container 108 may be used to store the liquid. The term "container" may be referred to a vessel or receptacle designed to hold and retain the liquid. This container 108 stores the liquid that needs to be processed, heated, or treated in some manner. The container 108 may be made up of a material including, but not limited to, a glass, a plastic, a stainless steel, or any other suitable material depending on the nature of the liquid and the intended purpose. In some embodiments, the bottom section 106 may be coupled to a dock (not illustrated in FIG. 1) for warming the liquid up to a predefined optimum temperature (for example, 20° C., 24° C., and the like). This coupling of the bottom section 106 with the dock may be achieved through a mechanism, such as magnetic connections, mechanical latches, or even simple placement.

The bottom section 106 may be coupled to a middle section 104. It should be noted that the middle section 104 includes a stabilizing element 110 for balancing the liquid storage device/bottle 100. The stabilizing element 110 may correspond to a self-aligning ball bearing. It should be noted that the self-aligning ball bearing may move within a designated space and absorb and dissipate energy of the movement to stabilize the liquid storage device/bottle 100 when a vibration force is experienced. The stabilizing element 110 ensures that the liquid within the container 108 remains steady and is not prone to undesirable movement or vibration.

The middle section 104 may include a set of detachable handles for holding the liquid storage device/bottle 100. The set of detachable handles may be designed to be easily attached and removed, enhancing flexibility and usability of the liquid storage device/bottle 100. A handle of the set of detachable handles may be attached to the stabilizing element 110 for preventing the liquid storage device/bottle 100 from tremoring. The handle connected to the stabilizing element 110 may effectively act as a countermeasure against unintended movement. Examples of the set of detachable handles include, but are not limited to, a single grip handle, a double grip handle, and a clipping grip handle. As illustrated in FIG. 1, the liquid storage device/bottle 100 includes a double grip handle 112. By way of an example, a user may attach a single grip handle for easy carrying, the double grip handle 112 for more secure handling when pouring, or even a clipping grip handle for hands-free convenience when dispensing water into a container.

The bottom section 106 may be coupled to a top section 102 through the middle section 104 for receiving the liquid from the bottom section 106 through a pumping mechanism 114. In some embodiments, a pump may be integrated for executing the pumping mechanism 114. In other words, the top section 102 may serve as the uppermost portion of the liquid storage device/bottle 100 and may be responsible for facilitating transfer of the liquid from the bottom section 106 through the pumping mechanism 114. The pumping mechanism 114 may pump the liquid from the bottom section 106 to the top section 102, making the liquid accessible for consumption, dispensing, or other desired uses.

Further, the top section 102 may include a set of detachable attachments. For example, the set of detachable attachments may include, but is not limited to, a sipper cap, a straw lid, an infuser attachment, a spray nozzle attachment, a lid, a screw-on cap, a flip-flop, a flap cap, a push-pull cap, and a push-button cup. The set of detachable attachments are explained in detail in FIG. 2. The set of detachable attachments offers users a range of options for customizing functionality and use of the liquid storage device/bottle 100. The set of detachable attachments may be removed and replaced as needed, enhancing versatility of the liquid storage device/bottle 100. By way of an example, the sipper cap makes it easy to drink liquid without unscrewing a lid, the straw lid allows for sipping through a straw, the infuser attachment for adding fruits or herbs to infuse the water with flavor, and the spray nozzle attachment for misting water. The set of detachable attachments caters to different preferences and situations. For instance, the sipper cap may be ideal for athletes who want to hydrate without stopping their activities.

It should be noted that one attachment of the set of detachable attachments includes a detachable cup 116. The detachable cup 116 may include an Ultraviolet-C (UV-C) button 118. The UV-C button 118, upon activation, may initiate sanitization of the detachable cup 116 and the pumping mechanism 114 to draw liquid into the detachable cup 116. In particular, the UV-C button 118 includes one or more UV Light Emitting Diodes (LEDs) 120. The UV-C button 118 may activate the one or more UV LEDs 120 for sanitizing the detachable cup 116. The pump may include a tube extending from the top section 102 to the bottom section 106 through the middle section 104 forming a pathway for the liquid to draw liquid into the detachable cup 116 through the pumping mechanism 114 in response to activation of the UV-C button 118.

The detachable cup 116 serves as a container for the liquid that is drawn from the bottom section 106 through the pumping mechanism 114 as described earlier. The UV-C button 118 is a control element that, when activated, triggers a series of actions aimed at ensuring cleanliness and safety of both the detachable cup 116 and the liquid. The UV-C light may have germicidal properties which may effectively deactivate or destroy microorganisms such as bacteria, viruses, and fungi. By way of an example, when a user activates the UV-C button 118, a process that utilizes the one or more UV LEDs 120 may be set. The one or more UV LEDs 120 emit the UV-C light, which is highly effective at killing harmful microorganisms. The activation of the UV LEDs 120 through the UV-C button 118 initiates the sanitization process. The UV-C light emitted by the UV LEDs 120 shine within the detachable cup 116 and initiate the pumping mechanism 114, neutralizing bacteria, viruses, and other potentially harmful agents that might be present at the surfaces of the detachable cup 116. This process provides a thorough and efficient means of maintaining cleanliness and preventing buildup of harmful microbes.

Figure 2:
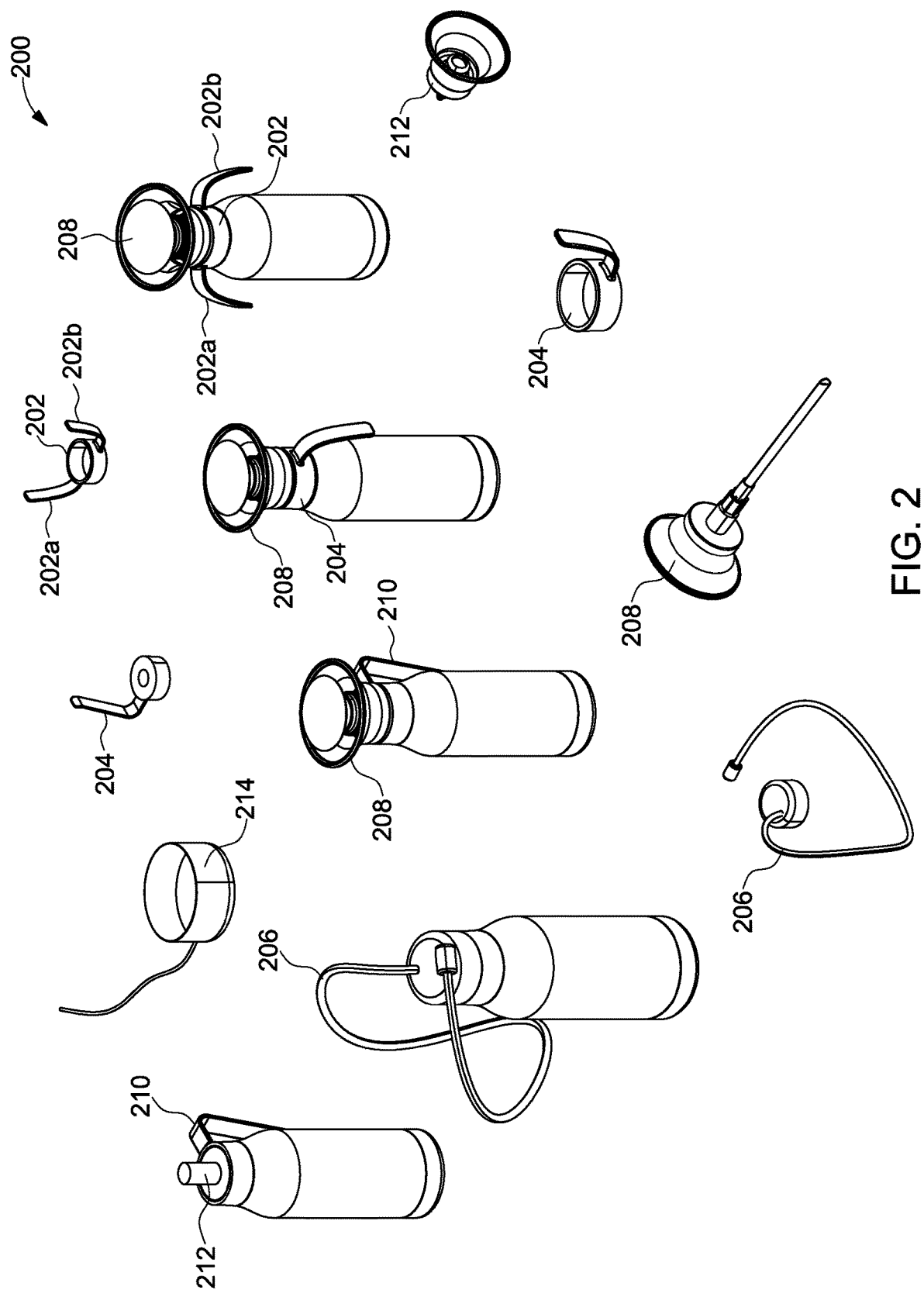
FIG. 2 illustrates exemplary attachments of a liquid storage device, in accordance with some embodiments of the present disclosure.

Referring now to FIG. 2, exemplary attachments 200 of a liquid storage device (such as the liquid storage device 100) are illustrated, in accordance with some embodiments of the present invention. FIG. 2 is explained in conjunction with FIG. 1. The attachments 200 may be detachable attachments. The attachments 200 may include a set of detachable handles at a middle section (for example, the middle section 104). The set of detachable handles may be used for holding the liquid storage device. The set of detachable handles may be attached to a stabilizing element (such as the stabilizing element 110) to prevent the liquid storage device from tremoring.

For example, the attachments 200 may include a double grip handle 202 (same as the double grip handle 112). The double grip handle 202 provides two separate grip points (i.e., grip points 202a and 202b), one for each hand. The double grip handle 202 distributes weight of the liquid storage device evenly between both hands, reducing strain and making it easier to carry heavier loads. The double grip handle 202 also offers enhanced stability, as hands may counterbalance any potential movements.

The attachments 200 may further include a single grip handle 204. The single grip handle 204 provides the users a singular point of contact for holding the liquid storage device. The single grip handle 204 may be optimal for scenarios where the users need to hold the liquid storage device with one hand while engaging in other activities simultaneously.

Further, the attachments 200 may further include a clipping grip handle 210 that may be attached to any device (such as a bed or a chair) using a clipping or locking mechanism. The clipping grip handle 210 allows versatility and customization. For example, users may be able to attach or detach the handle through a clipping grip to any device as needed. In other words, the liquid storage device may have a clip for hanging the liquid storage device to a stand of a bed or a wheelchair. In this case, a top section (such as the top section 102) of the liquid storage device may include a pipe 206, i.e., an attachment for a top section, for drinking directly without touching the liquid storage device. In the present arrangement, a detachable cup 208 same as the detachable cup 116 (i.e., an attachment for the top section) may be removed and replaced with the pipe 206.

The detachable cup 208 may be configured for collecting the liquid received from a bottom section (such as the bottom section 106). The detachable cup 208 may include an Ultraviolet-C (UV-C) button (same as the UV-C button 118) configured for initiating sanitization of the detachable cup 208 and initiating a pumping mechanism (such as the pumping mechanism 114) to draw the liquid into the detachable cup 208. This is further explained in detail in conjunction with FIG. 3.

The attachments 200 may further include a set of detachable attachments associated with the top section. For example, the attachments 200 may include a sipper cap 212 to drink the liquid from the liquid storage device directly and without the sanitization process when a straw is present in the liquid storage device.

The attachments 200 may further include a dock 214. The dock 214 may be configured for warming the liquid up to an optimum temperature (for example, 20° C.) for immediate and safe consumption. Further, the dock 214 may prevent the liquid storage device from accidentally falling. The dock 214 may be attached through a mechanism, such as magnetic connections, mechanical latches, or even simple placement. This warming feature of the dock 214 ensures that the liquid pumped into the detachable cup 208 is at a desired temperature for consumption.

Figure 3:
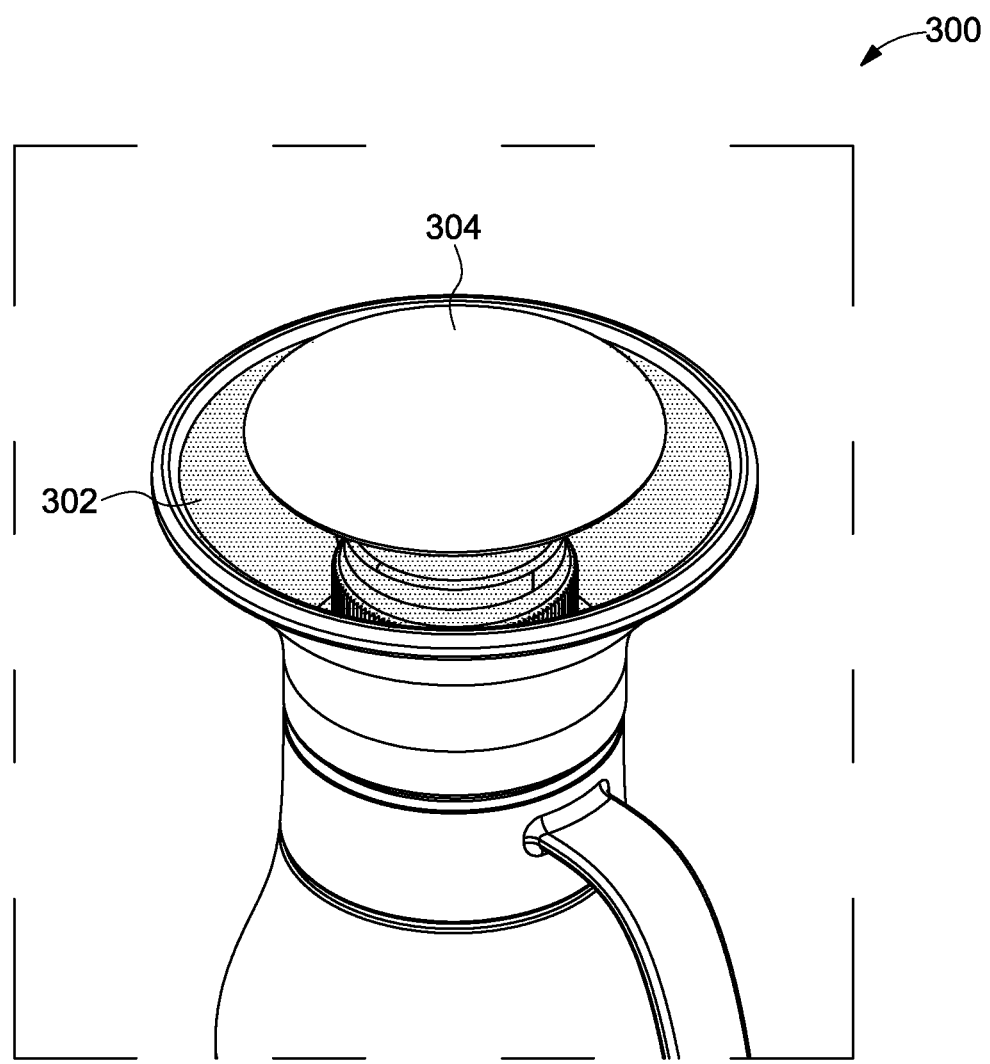
FIG. 3 illustrates a top section of a liquid storage device with an activated Ultraviolet-C (UV-C) button, in accordance with some embodiments of the present disclosure.

Referring now to FIG. 3, a top section 300 (such as the top section 102) of a liquid storage device (such as the liquid storage device 100) with an activated UV-C button (such as the UV-C button 118) is illustrated, in accordance with some embodiments of the present invention. FIG. 3 is explained in conjunction with FIGS. 1-2. The top section 300 may include a set of detachable attachments. The set of detachable attachments may include, but is not limited to, a sipper cap, a straw lid, an infuser attachment, a spray nozzle attachment, a lid, a screw-on cap, a snap-on cap, a flip-top cap, a flap cap, a push-pull cap, and a push button cap.

As illustrated in FIG. 3, a detachable attachment is a detachable cup 302. The detachable cup 302 may be configured for collecting liquid received from a bottom section (such as the bottom section 106). The detachable cup 302 may further include a push button 304 (for example, the UV-C button 118) in the center of the detachable cup 302. The push button 304 may be activated when pressed. Activation of the push button 304 may start initiation of sanitization of the detachable cup 302 and a pumping mechanism (such as the pumping mechanism 114) to draw the liquid into the detachable cup 302. It should be noted that the push button 304 may include a one or more UV Light Emitting Diodes (LEDs). Activation of the push button 304 activates the one or more UV LEDs for sanitizing the detachable cup 302.

By way of an example, when a user activates the push button 304, a process that utilizes the UV LEDs may be set. The UV LEDs emit UV-C light, which is highly effective at killing harmful microorganisms. The activation of the UV LEDs through the push button 304 initiates the sanitization process. The UV-C light emitted by the UV LEDs shines (as shown in FIG. 3) within the detachable cup 302 and initiate the pumping mechanism, neutralizing bacteria, viruses, and other potentially harmful agents that might be present on the surfaces of the detachable cup 302. This process provides a thorough and efficient means of maintaining cleanliness and preventing buildup of harmful microbes.

Figure 4:
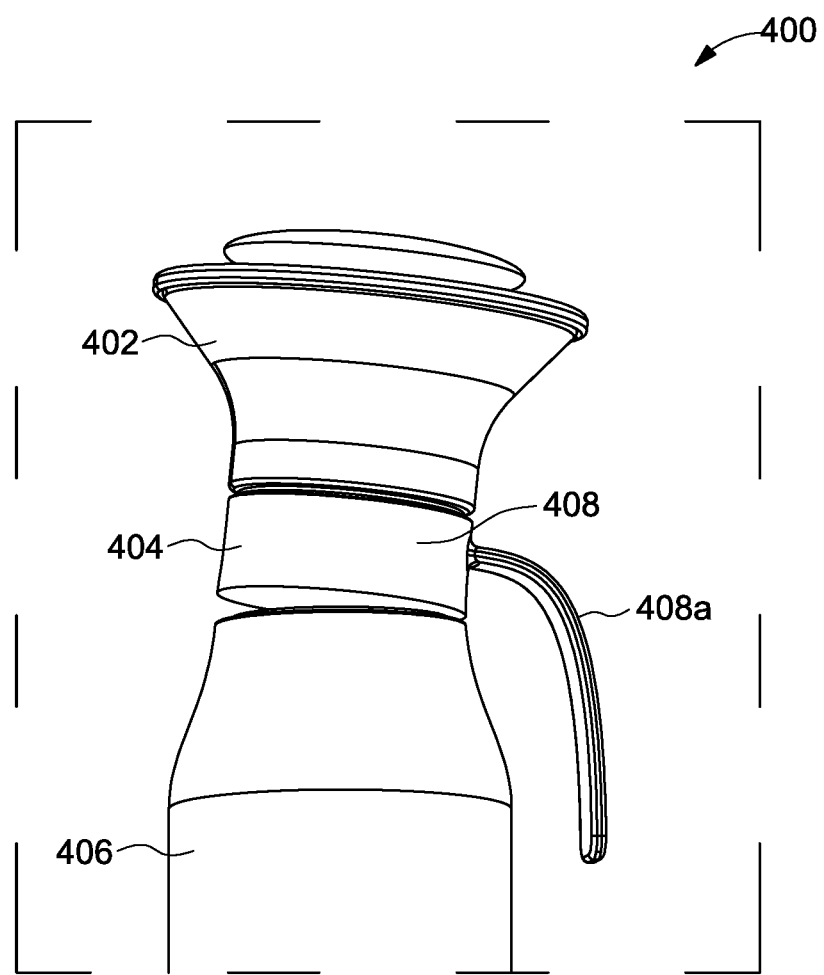
FIG. 4 illustrates an exemplary liquid storage device, in accordance with some embodiment of the present disclosure.

Referring now to FIG. 4, an exemplary liquid storage device 400 (such as the liquid storage device 100) is illustrated, in accordance with some embodiments of the present invention. FIG. 4 is explained in conjunction with FIGS. 1-3. The liquid storage device 400 includes a top section 402 (same as the top section 102), a middle section 404 (same as the middle section 104), and a bottom section 406 (same as the bottom section 106). The middle section 404 may include a stabilizing element (same as the stabilizing element 110 and not illustrated in FIG. 4) and a handle 408.

The handle 408 may be attached to the stabilizing element. The stabilizing element may be configured for balancing the liquid storage device 400. The stabilizing element may correspond to a self-aligning ball bearing. The self-aligning ball bearing moves within a designated space, and absorbs and dissipates energy of movement to stabilize the liquid storage device 400 when a vibration force is experienced. In other words, when vibrations occur due to shaking hand of a user who may be suffering from a diseases or an elderly person, the self-aligning ball bearing adjusts its position within the designated space. This adjustment absorbs a significant portion of the energy generated by the vibrations. Instead of allowing the vibrations to propagate throughout the liquid storage device 400, the self-aligning bearing redirects and disperses this energy within itself, effectively dampening the vibrations. This process helps in maintaining overall stability of the liquid storage device 400, preventing liquid storage device 400 from shaking excessively.

The handle 408 may be detachable. The handle 408 may be used for holding the liquid storage device 400 and preventing the liquid storage device 400 from tremoring. As illustrated in FIG. 4, the handle may have a single grip 408a. The single grip 408a provides users a singular point of contact for holding the liquid storage device 400. The single grip 408a may be optimal for scenarios where the users need to hold the liquid storage device 400 with one hand while engaging in other activities simultaneously.

In some embodiments, the handle may be replaced with one of a double grip handle, or a clipping grip handle, based on requirement. In other words, the handle's grip is not limited to the single grip 408a. Instead, the handle may be adapted to suit different requirements or user preferences. The double grip handle provides two separate grip points, one for each hand. The double grip handle distributes the weight of the liquid storage device 400 evenly between both hands, reducing strain and making it easier to carry heavier loads. The double grip handle also offers enhanced stability, as the hands may counterbalance any potential movements. The clipping grip handle may be a handle that may be attached to any device (such as a bed or a chair) using a clipping or locking mechanism. The clipping grip handle allows versatility and customization. The users may be able to attach or detach the handle through a clipping grip to any device as needed.

As the handle 408 is detachable, this feature enhances user experience when interacting with the liquid storage device 400. The liquid storage device 400 is designed in such a way that its design aims to accommodate a comfortable grip, allowing users to hold and carry the liquid storage device 400, with ease. Additionally, the handle is strategically positioned to counteract the effects of tremors or vibrations that might be introduced into the liquid storage device 400 during operation, ensuring that liquid contents remain stable.

Figure 5:
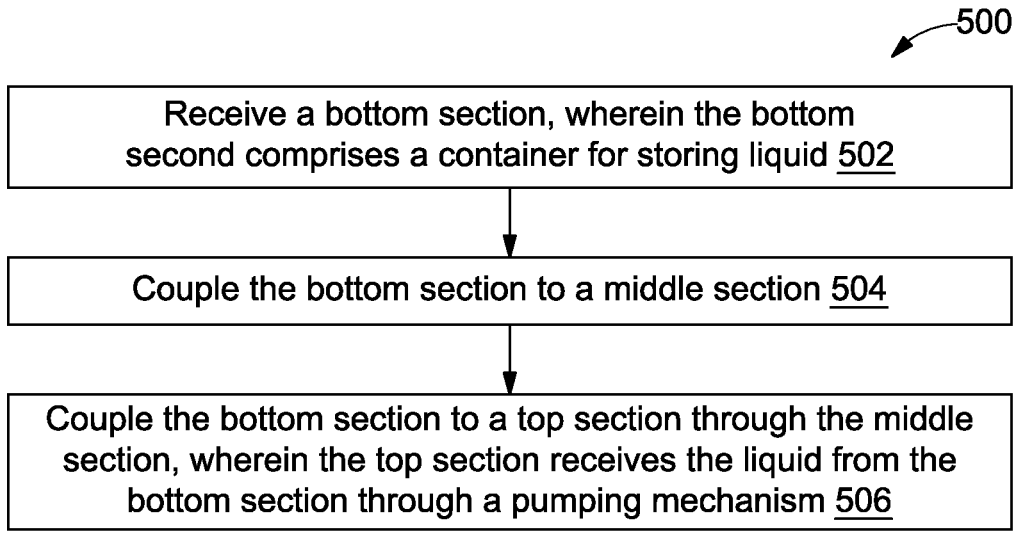
FIG. 5 illustrates an exemplary process of a method of manufacturing a liquid storage device, in accordance with some embodiments of the present disclosure.

Referring now to FIG. 5, a method 500 of manufacturing a liquid storage device (for example, the liquid storage device 100) is depicted via a flow chart, in accordance with some embodiments of the present disclosure. FIG. 5 is explained in conjunction with FIGS. 1-4. At step 502, a bottom section (such as the bottom section 106) may be received. The bottom section may include a container (for example, the container 108). The container may be used for storing liquid. The term "container" may be referred to a vessel or receptacle designed to hold and retain the liquid. This container stores the liquid that needs to be processed, heated, or treated in some manner. The container may be made up of a material including a glass, a plastic, a stainless steel, or any other suitable material depending on the nature of the liquid and the intended purpose. In some embodiments, the bottom section may be coupled to a dock (for example, the dock 214) for warming the liquid up to a predefined optimum temperature (for example, 20° C., 24° C., and the like). This coupling of the bottom section with the dock may be achieved through a mechanism, such as magnetic connections, mechanical latches, or even simple placement.

By way of an example, consider a baby bottle warmer. In this case, the bottom section may be a part of the warmer that holds the baby bottle securely. The dock, in this case, may be the base of the warmer that contains heating elements. When the bottom section (with the baby bottle filled with milk) is placed on the dock, the dock may start warming the milk inside the container to the optimal temperature for feeding.

Further, at step 504, the bottom section may be coupled to a middle section (for example, the middle section 104). It should be noted that the middle section includes a stabilizing element (for example, the stabilizing element 110) for balancing the liquid storage device. The stabilizing element may correspond to a self-aligning ball bearing. It should be noted that the self-aligning ball bearing may move within a designated space, and absorb and dissipate energy of the movement to stabilize the liquid storage device when a vibration force is experienced. The stabilizing element ensures that the liquid within the container remains steady and is not prone to undesirable movement or vibration.

Further, the middle section includes a set of detachable handles for holding the liquid storage device. The set of detachable handles may be designed to be easily attached and removed, enhancing flexibility and usability of the device. One handle of the set of detachable handles may be attached to the stabilizing element for preventing the liquid storage device from tremoring. The one handle connected to the stabilizing element may effectively act as a countermeasure against unintended movement. Examples of the set of detachable handles include, but are not limited to, a single grip handle (for example, the single grip handle 204), a double grip handle (for example, the double grip handle 112), and a clipping grip handle (for example, the clipping grip handle 210). By way of an example, a user may attach a single grip handle for easy carrying, a double grip handle for more secure handling when pouring, or even a clipping grip handle for hands-free convenience when dispensing water into a container.

At step 506, the bottom section may be coupled to a top section (for example, the top section 102) through the middle section for receiving the liquid from the bottom section through a pumping mechanism (such as the pumping mechanism 114). In some embodiments, a pump may be integrated for executing the pumping mechanism. In other words, the top section may serve as the uppermost portion of the liquid storage device and may be responsible for facilitating transfer of the liquid from the bottom section through the pumping mechanism. The pumping mechanism may pump the liquid from the bottom section to the top section, making the liquid accessible for consumption, dispensing, or other desired uses.

Further, the top section includes a set of detachable attachments. For example, the set of detachable attachments may include, but is not limited to, a sipper cap, a straw lid, an infuser attachment, a spray nozzle attachment, a lid, a screw-on cap, a flip-flop, a flap cap, a push-pull cap, and a push-button cup. The set of detachable attachments offers users a range of options for customizing functionality and use of the liquid storage device. The set of detachable attachments may be removed and replaced as needed, enhancing versatility of the liquid storage device. By way of an example, the sipper cap makes it easy to drink liquid without unscrewing a lid, the straw lid allows for sipping through a straw, the infuser attachment for adding fruits or herbs to infuse the water with flavor, and the spray nozzle attachment for misting water. The set of detachable attachments caters to different preferences and situations. For instance, the sipper cap may be ideal for athletes who want to hydrate without stopping their activities.

It should be noted that one attachment of the set of detachable attachments includes a detachable cup (such as the detachable cup 116). The detachable cup may include an Ultraviolet-C (UV-C) button (such as the UV-C button 118). The UV-C button upon activation may initiate sanitization of the detachable cup and the pumping mechanism to draw liquid into the detachable cup. In particular, the UV-C button includes one or more UV Light Emitting Diodes (LEDs) (such as the UV LEDs 120). The UV-C button may activate the one or more UV LEDs for sanitizing the detachable cup. The pump may include a tube extending from the top section to the bottom section through the middle section forming a pathway for the liquid to draw liquid into the detachable cup through the pumping mechanism in response to activation of the UV-C button.

The detachable cup serves as a container for the liquid that is drawn from the bottom section through the pumping mechanism as described earlier. The UV-C button is a control element that, when activated, triggers a series of actions aimed at ensuring cleanliness and safety of both the detachable cup and the liquid. The UV-C light may have germicidal properties which may effectively deactivate or destroy microorganisms such as bacteria, viruses, and fungi.

By way of an example, when a user activates the UV-C button, a process that utilizes the one or more UV LEDs may be set. The one or more UV LEDs emit UV-C light, which is highly effective at killing harmful microorganisms. The activation of the UV LEDs through the UV-C button initiates the sanitization process. The UV-C light emitted by the UV LEDs shines within the detachable cup and initiates the pumping mechanism, neutralizing bacteria, viruses, and other potentially harmful agents that might be present on the surfaces of the detachable cup. This process provides a thorough and efficient means of maintaining cleanliness and preventing buildup of harmful microbes. Consider a scenario involving a travel water bottle with this UV-C sanitization feature. When the user activates the UV-C button on the detachable cup, the UV LEDs emit UV-C light into the detachable cup and the pumping mechanism may be started. As water is pumped into the detachable cup, it undergoes the sanitization process, ensuring that any potential contaminants in the liquid are neutralized by the UV-C light before the user consumes the water.

Figure 6:
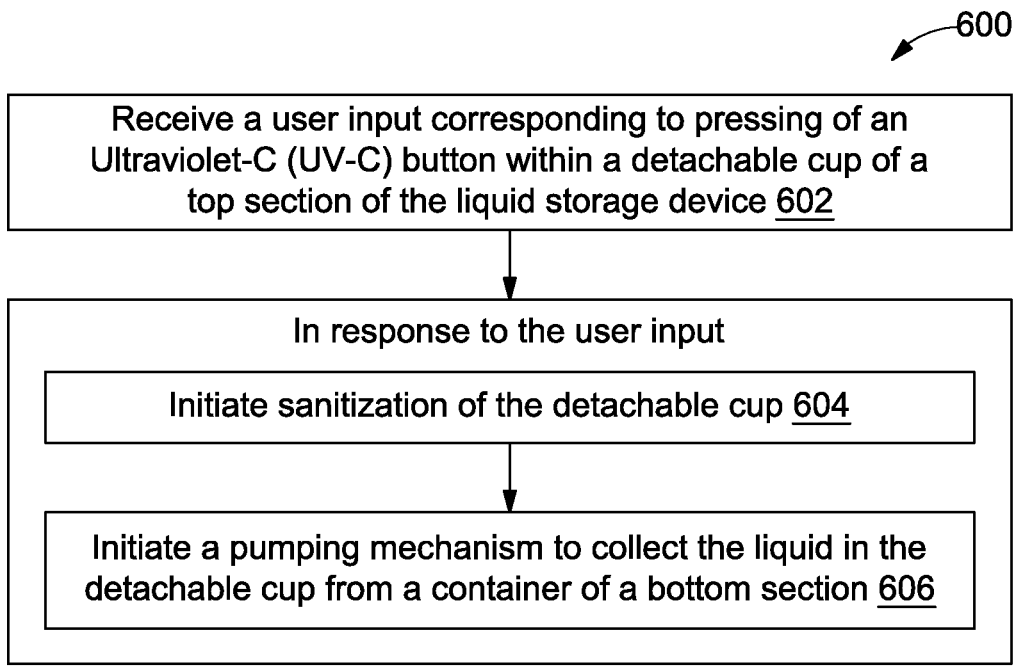
FIG. 6 illustrates an exemplary process of a method of pumping liquid in a liquid storage device, in accordance with some embodiments of the present disclosure.

Referring now to FIG. 6, a method 600 of pumping liquid in a liquid storage device (such as the liquid storage device 100) is depicted via a flowchart, in accordance with an embodiment of the present invention. FIG. 6 is explained in conjunction with FIGS. 1-5. At step 602, a user input corresponding to pressing of an Ultraviolet-C (UV-C) button (such as the UV-C button 118) within a detachable cup (such as the detachable cup 116) of a top section (such as the top section 102) of the liquid storage device may be received. The UV-C button may include one or more UV Light Emitting Diodes (LEDs) (such as the UV LEDs 120).

Thereafter, at step 604, in response to the user input, sanitization of the detachable cup may be initiated. It should be noted that activation of the UV-C button activates the UV LEDs for sanitizing the detachable cup. Further, at step 606, a pumping mechanism (such as the pumping mechanism 114) may be initiated to collect the liquid in the detachable cup from a container of a bottom section (Such as the container 108 of the bottom section 106). In some embodiments, the bottom section 106 may be coupled to a dock (such as the dock 214) for warming the liquid up to a predefined optimum temperature. This warming feature ensures that the liquid pumped into the detachable cup is at a desired temperature for consumption.

In other words, when a user presses the UV-C button, a command or signal may be generated because of this input. The input may further initiate a sanitization process for the detachable cup. The UV LEDs may be activated, emitting ultraviolet-C light, which is known to have germicidal properties, effectively sanitizing the interior of the detachable cup. Once the detachable cup has been sanitized, the next step is to initiate the pumping mechanism that collects liquid from the container located in the bottom section of the liquid storage device.

The liquid storage device may include a pump for executing the pumping mechanism. The pump may include a tube extending from the top section to the bottom section through a middle section (Such as the middle section 104) forming a pathway for the liquid to draw liquid into the detachable cup through the pumping mechanism in response to activation of the UV-C button.

The middle section may include a stabilizing element (such as the stabilizing element 110) for balancing the liquid storage device, and a set of detachable handles for holding the liquid storage device. The set of detachable handles provides a convenient way for users to hold and carry the liquid storage device. A handle of the set of the detachable handles may be attached to the stabilizing element for preventing the liquid storage device from tremoring. The handle ensures that the liquid storage device remains stable even when handled or moved by the user. It should be noted that the stabilizing element may correspond to a self-aligning ball bearing. The self-aligning ball bearing may move within a designated space, and absorb and dissipate energy of movement to stabilize the liquid storage device when a vibration force is experienced. This stabilization maintains proper functioning of the liquid storage device even when the liquid storage device is subject to external forces or vibrations (which might otherwise affect the pumping process or overall functionality).

Thus, the present disclosure may overcome drawbacks of traditional systems discussed before. The present disclosure includes a customizable design of a liquid storage device that caters to diverse needs of users. The disclosure focuses on dispensing of sterilized water through a simple pumping action. The disclosure is helpful for elderly people who may experience tremors or stability issues in their advanced age. To address challenges posed by shaky hands, especially common among the elderly people, the disclosure incorporates a variety of grips and a stabilizing element. These grips and the stabilizing element ensure a firm hold on the liquid storage device, enhancing stability during usage. With regards to the stability, the feature stabilizing element effectively counteracts effects of tremors, ensuring that the liquid storage device remains steady during use. Moreover, the disclosure incorporates different handles, each provides a gentle and secure grip.

Further, to accommodate a wide range of users, the liquid storage device is accompanied by different tops that feature varying levels of accessibility features. The different attachments are included (for example, a sipper cup) for different individual preferences and modes of drinking. Additionally, a pump is integrated into the liquid storage device. The pump facilitates easy filling of a cup within the top section. The cup includes UV LEDs that serve a dual purpose of illumination and further sanitization. To enhance the overall user experience, a warming dock is introduced as part of the liquid storage device. This dock serves two critical functions, i.e., brings the stored water to an optimal temperature for consumption and prevents inadvertent falls, contributing to both safety and comfort.

The liquid storage device includes customizable tops and grips, a pump, LED sanitization, stabilizing element, various handles, and a warming dock. Thus, the liquid storage device provides a solution that caters to the needs of a diverse user base.

Further, the sipper, and anti-tremble grip of the liquid storage device allows the user to drink water without worry of spillage and without touching, for example, by a clip attachment for hanging the liquid storage device to the chair or bed. The self-sanitizing top cup reduces the risk of germs and infections.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A liquid storage device comprising:
    a bottom section comprising a container for storing liquid;
    a middle section coupled to the bottom section, wherein the middle section comprises:
        a stabilizing element for balancing the liquid storage device; and
        a set of detachable handles for holding the liquid storage device, wherein a handle of the set of the detachable handles is attached to the stabilizing element for preventing the liquid storage device from tremoring; and
    a top section coupled to the bottom section through the middle section for receiving the liquid from the bottom section through a pumping mechanism, wherein the top section comprises a set of detachable attachments, and wherein one attachment of the set of detachable attachments comprises:
        a detachable cup for collecting the liquid received from the bottom section, wherein the detachable cup comprises an Ultraviolet-C (UV-C) button configured for:
            upon activation,
                initiating sanitization of the detachable cup; and
                initiating the pumping mechanism to draw liquid into the detachable cup.

2. The liquid storage device of claim 1, wherein the set of detachable attachments further comprises a sipper cap, a straw lid, an infuser attachment, a spray nozzle attachment, a lid, a screw-on cap, a snap-on cap, a flip-top cap, a flap cap, a push-pull cap, and a push button cap.

3. The liquid storage device of claim 1, wherein the set of detachable handles comprises at least one of a single grip handle, a double grip handle, or a clipping grip handle.

4. The liquid storage device of claim 1, wherein the UV-C button comprises one or more UV Light Emitting Diodes (LEDs), and wherein activation of the UV-C button activates the one or more UV LEDs for sanitizing the detachable cup.

5. The liquid storage device of claim 1, wherein the stabilizing element corresponds to a self-aligning ball bearing, and wherein the self-aligning ball bearing moves within a designated space, and absorbs and dissipates energy of movement to stabilize the liquid storage device when a vibration force is experienced.

6. The liquid storage device of claim 1, wherein the bottom section is coupled to a dock for warming the liquid up to a predefined optimum temperature.

7. The liquid storage device of claim 1, further comprises a pump for executing the pumping mechanism, wherein the pump further comprises a tube extending from the top section to the bottom section through the middle section forming a pathway for the liquid to draw liquid into the detachable cup through the pumping mechanism in response to activation of the UV-C button.

* * * * *